(12) United States Patent
Burkard et al.

(10) Patent No.: US 7,321,884 B2
(45) Date of Patent: Jan. 22, 2008

(54) METHOD AND STRUCTURE TO ISOLATE A QUBIT FROM THE ENVIRONMENT

(75) Inventors: Guido Burkard, Irvington, NY (US); David P. DiVincenzo, Tarrytown, NY (US); George A. Keefe, Cortlandt Manor, NY (US); Roger H. Koch, Amawalk, NY (US); James R. Rozer, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/782,811

(22) Filed: Feb. 23, 2004

(65) Prior Publication Data

US 2005/0184284 A1   Aug. 25, 2005

(51) Int. Cl.
*G06F 17/00* (2006.01)
*G06N 5/02* (2006.01)
(52) U.S. Cl. .............................. 706/46; 706/45; 706/14
(58) Field of Classification Search ................. 706/46, 706/45, 14; 359/108
See application file for complete search history.

(56) References Cited

FOREIGN PATENT DOCUMENTS

JP         2003-508948         3/2003

OTHER PUBLICATIONS

Michael A. Nielsen et al., Quantum Computation and Quantum Information, 2000, Cambridge.*
A. Kuhn et al., Controlled single-photon emission from a coupled atom-cavity system, Sep. 2000, Quantum Electronics Conference Digest 2000 International.*
S. M. Girvin et al., Prospects for strong Cavity Quantum electrodynamics with Superconducting Circuits, 1-18.*
S.M. Girvin, Ren-Shou Huang, Alexandre Blais, Andreas Wallraff, and R.J. Schoelkopf, "Prospects for Strong Cavity Quantum Electrodynamics with Superconducting Circuits," Sep. 8, 2003, Yale University report, pp. 1-18.

\* cited by examiner

*Primary Examiner*—Joseph P Hirl
(74) *Attorney, Agent, or Firm*—Steven C. Kaufman, Esq.; McGinn IP Law Group, PLLC

(57) ABSTRACT

A method (and structure) of coupling a qubit includes locating the qubit near a transmission line approximately at a location corresponding to a node at a predetermined frequency.

18 Claims, 3 Drawing Sheets

METHOD AND STRUCTURE TO ISOLATE A QUBIT FROM THE ENVIRONMENT

U.S. GOVERNMENT RIGHTS IN THE INVENTION

This invention was made with Government support under Grant No. MDA972-01-C-0052 from the U.S. Defense Advanced Research Projects Agency (DARPA). The Government has certain rights to this invention.

BACKGROUND OF THE INVENTION

1. Field of the Invention

The present invention generally relates to a quantum computer. More specifically, to a method and structure which locates a qubit at a node of a qubit basic operational frequency on control and readout transmission lines, so as to minimize decoherence caused by these control and readout functions.

2. Description of the Related Art

A number of entities, including the assignee of the present Application, are in the process of designing, developing, and building computers that use the quantum mechanical state of a physical system to represent the logical state of the computer. Such a computer is called a "quantum computer" and the logical gates in such a computer are called "qubits".

A quantum computer would be able to solve certain types of problems far more rapidly than any conceivable classical computer. For example, such tasks as searching, encryption, and searching a large database for the optimal solution to a multidimensional optimization problem, such as the well-known "traveling salesman" problem, would be orders of magnitude faster on a quantum computer.

The reason for this drastic increase in capability is that, in an ordinary classical computer, the logical state of the computer is represented by "0"s and "1"s, or in other words, the classical states of a physical system. Therefore, the basic logic gate in the classical computer stores a single bit of information. In contrast, a qubit simultaneously stores multiple bits of information.

A fundamental problem in making a qubit is that of minimizing the effects of the environment on the quantum mechanical state of the qubit. This effect is similar to that of noise in a conventional circuit, such as a basic logic gate, in that sufficient noise will cause a conventional logic gate to toggle to a new and possibly unknown state.

The small size, the quantum mechanics involved, and the plurality of possible states (e.g., the plurality of bits of information) all combine to cause a qubit to be particularly sensitive to "noise" such as temperature and stray magnetic fields.

A partial solution is to operate the qubit at a very cold temperature, typically less than 0.1 K. In this way, the thermal noise that the qubit experiences is reduced.

Also, the qubit itself is usually designed to have very little internal dissipation. In this way, direct coupling of the qubit to the thermal noise of the environment is minimized.

The noise in the environment causes "decoherence", or reduction of the magnitude or duration of the qubit signal. Thus, decoherence must be minimized in order to make a high quality qubit, which is needed for making a quantum computer.

A second type of decoherence occurs when electrical circuits and signals are applied to the qubit. A qubit could be designed to be totally isolated from the environment. But, unless its state can be modified or measured using external circuits, the qubit will be of little use.

The most common method to modify the qubit state and measure the state is by the use of electrical signals. Unfortunately, the sources of these electrical signals and the measuring circuits also inherently have thermal and quantum noise, and this noise will decohere the qubit. Therefore, the couplings of these signals to the qubit are usually designed to be weak, in order to minimize the decoherence from the control and readout circuits.

So far, there has not been a satisfactory solution for this inherent decoherence problem of qubits.

SUMMARY OF THE INVENTION

In view of the foregoing, and other, exemplary problems, drawbacks, and disadvantages of the conventional system, it is an exemplary feature of the present invention to provide a method and structure to address the inherent problem of decoherence in a qubit.

It is another exemplary feature of the present invention to provide a method of coupling to a qubit for controlling the qubit or reading a state of the qubit in a manner that minimizes the inherent problem of decoherence.

It is another exemplary feature of the present invention, for minimizing decoherence of the control and readout transmission lines and circuits, to provide a method of strengthening the coupling to a qubit, relative to conventional coupling methods.

To achieve the above exemplary features and others, in a first exemplary aspect of the present invention, described herein is a method of coupling to a qubit, including locating the qubit near a transmission line approximately at a location corresponding to a node in the control parameter at a basic operating frequency of the qubit.

In accordance with an exemplary second aspect of the present invention, also described herein is a circuit including a qubit having a basic operating frequency and at least one transmission line related to an operation of the qubit, wherein the qubit is located near the transmission line approximately at a node in the control parameter at the basic operating frequency.

In accordance with an exemplary third aspect of the present invention, also described herein is a circuit including at least one qubit and a means for coupling to the at least one qubit in a manner that minimizes a decoherence of the at least one qubit.

In accordance with an exemplary fourth aspect of the present invention, also described herein is a method of forming a qubit circuit, including providing a transmission line to be used for one of controlling the qubit and reading out a state of the qubit and locating the qubit near the at least one transmission line approximately at a location corresponding to a node at a predetermined frequency related to a basic operation of the qubit.

In accordance with an exemplary fifth aspect of the present invention, also described herein is a method of isolating a qubit from its environment, including locating the qubit at a location along a transmission line that minimizes a decoherence of the qubit.

The present invention, therefore, provides a method and circuit to minimize decoherence caused, for example, by control and readout functions of a qubit. It also provides a method in which coupling to the qubit for control and readout functions can be increased, by providing a method to couple to the qubit that minimizes noise at a basic operating frequency of the qubit.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
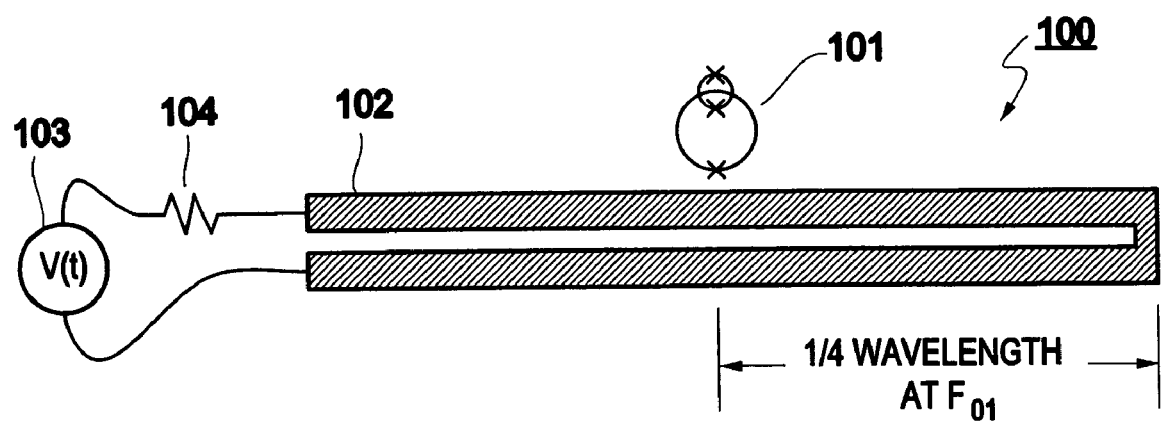
FIG. 1 shows one exemplary configuration 100 for coupling to a qubit in accordance with the principles of the present invention.

Referring now to the drawings, and more specifically, FIGS. 1-4, the present invention provides a method of decoupling a qubit from the environment at a frequency that has the largest effect in causing decoherence in the qubit (e.g., frequency F01), while at the same time coupling the qubit at most other frequencies, such as the frequencies over which the qubit is operated and measured.

For a qubit, the noise from the environment will usually vary as a function of frequency. In the normal operation of a qubit, the environmental noise at two specific frequencies is important. The most important frequency (e.g., the noise that decoheres the qubit the most) is noise at the basic operational frequency of the qubit, referred to as the "F01" frequency.

In other words, F01 is the frequency difference between the "0" (e.g., the lowest energy state) and the "1" (e.g., the second lowest energy state of the qubit). However, the present invention should not be viewed as limited to the F01 frequency, since some qubit designs operate at other frequencies, such as "F12". Thus, the present invention includes a broader concept in which details may vary from one qubit design to another and frequency "F01" is exemplarily used herein for the sake of discussion.

A second important frequency in terms of decoherence is the noise near zero frequency, typically referred to as "dc".

A strategy is currently known that reduces the decoherence from the environment from the zero frequency noise (e.g., dc). That strategy is to operate the qubit at a "degenerate point". A degenerate point is somewhat like a local minimum in a characteristic curve. At this point, small changes in the environment do not produce first order changes in the operating point.

Similarly, when a qubit is designed to operate at a degenerate point, small changes in the dc noise level do not change the basic operation frequency of the qubit, and hence do not decohere the qubit. This effect is similar to operating the qubit at a balanced point. The measured coherence of a qubit will greatly increase when operated at the degenerate point, as the effective dc or very low frequency noise is reduced.

However, unfortunately, the noise at frequency F01 is not reduced at the degenerate point. Decoherence, therefore, remains a problem, even when the qubit operates at one of its degenerate points, and is due to the noise at frequency F01.

The present invention addresses this problem of this noise, exemplarily at frequency F01. Thus, in view of the discussion above, the present invention can be described as decoupling a qubit from the environment at a frequency, such as F01, that has the largest effect in causing decoherence in the qubit, while still allowing the qubit to be coupled at most other frequencies, such as the frequencies over which the qubit is operated and measured.

This result is accomplished by adjusting the coupling of the qubit to a transmission line, usually a superconducting transmission line. By adjusting the length of the transmission line and the terminations at both ends, the present invention thereby teaches arranging a current or voltage node for the frequency (e.g., F01) at a particular location along the transmission line, and that the qubit be placed at that node location.

It is noted that a node is a point in the transmission line where the signal is zero. An antinode is a point where the signal is peak. A voltage node is a current antinode in a transmission line, and vice versa.

As is well known in the art, the node can be implemented by terminating the ends of the transmission line using opens or shorts, depending upon whether a voltage or current node is desired. The use of a resistive termination would preferably be avoided, since such resistive termination would be noisy, and that noise would be coupled to the qubit.

FIG. 1 shows a first exemplary configuration 100 that illustrates this basic concept. Qubit 101 is placed near transmission line 102 that is connected to a circuit 103. Transmission line 102 provides a function of coupling to qubit 101 for the purpose of either controlling or reading out the qubit's state. Qubit 101 would typically have one or more such transmission lines, some for control inputs and some for reading out the state of the qubit. For simplicity, only one transmission line 102 is shown in FIG. 1.

Exemplary transmission line 102 is a coplanar strip line that would be used to pass current from control circuit 103 so that magnetic flux from the current flow would be used as one of the control inputs into qubit 101. As shown in FIG. 1, qubit 101 is located near a node of the transmission line 102 and, ideally, would be exactly at the node location. To one of ordinary skill in the art, other transmission line configurations will be readily apparent, after understanding the discussion herein and taking it as a whole, and after considering the additional exemplary configurations described shortly.

The resistive element 104 shown in FIG. 1 is intended to represent both the noise aspect of the control circuit 103 and its aspect of having a characteristic output impedance to which the transmission line is designed to match (e.g., 50 $\Omega$).

Transmission line 102 would, therefore, typically be designed with a number of parameters in mind, as is well known in the art. For example, the coplanar strip line shown in FIG. 1 would have a length and line separation to match the circuit 103 output impedance (e.g., 50 $\Omega$) and a thickness and width to provide the current capacity. The material for the transmission line 102 would typically be a superconductor material such as aluminum or niobium. Exemplarily, a typical transmission line is designed to operate at 2 GHz, a typical value for a qubit F01 frequency, and has a typical length of approximately 1 cm.

Usually the qubit will be of smaller physical dimensions (e.g., 100 μm) than the length of the transmission line and, as stated above, it would be placed at a current or voltage node along the line. In current prototypes of the configuration exemplarily shown in FIG. 1, the qubit 101 is located approximately 2, 30, or 100 μm from the transmission line 102, depending upon which of the three qubit transmission lines is involved. It should be apparent that the distance between the qubit and the transmission line is one parameter that is used to determine the degree of coupling.

There are various qubit designs currently in development by various groups throughout the world, using a number of approaches. In accordance with the concepts of the present invention, a qubit that is operated using magnetic flux or a current would be placed at a current node at the F01 frequency for that qubit. Similarly, a qubit that is operated using voltage would be placed at a voltage node at the frequency F01.

To expound a bit more, as a non-limiting example, FIG. 1 shows a flux qubit 101 that is placed ¼ wavelength (at the F01 frequency) from the shorted end of superconducting transmission line. At the quarter-wave point, there is no current at frequency F01. Also the impedance at that frequency at the point is space is very high and, ideally, infinite.

In other words the qubit 101 is, in theory, totally uncoupled from the electrical noise of this circuit 103 at the crucial F01 frequency. At the same time, the qubit can still be operated, since the control signals can be chosen to exclude components at the F01 frequency.

The same method can be used reduce the noise from the electrical circuit that is used to measure the state of the qubit. Here, the noise from the measurement circuit (e.g., a preamplifier), at the F01 frequency, would greatly decohere the qubit. In most cases, the measurement frequency is not F01, but at much lower frequencies. Hence, the measurement can be done, while at the same time shielding the qubit from the F01 frequency noise of the qubit.

Unfortunately, in the "real world", the qubit cannot be reduced in size to be confined to the theoretical point-size of the node. Therefore, one additional parameter of some interest relates to the fact that the qubit, although small in size, is not infinitely small. The present inventors have discovered that this unavoidable small amount of coupling can be minimized as a function of the ratio of the qubit size and the length of the transmission line. In the exemplary configuration of FIG. 1, this ratio might, therefore, be approximately the ratio of 1 cm to 100 μm.

At this point, it is again noted that the exemplary flux qubit 101 shown in FIG. 1 is intended only for purpose of illustration. Other types of qubits would benefit from the concepts of the present invention, since a generic qubit inherently suffers from a problem of decoherence at a specific frequency, such as F01.

Figure 2:
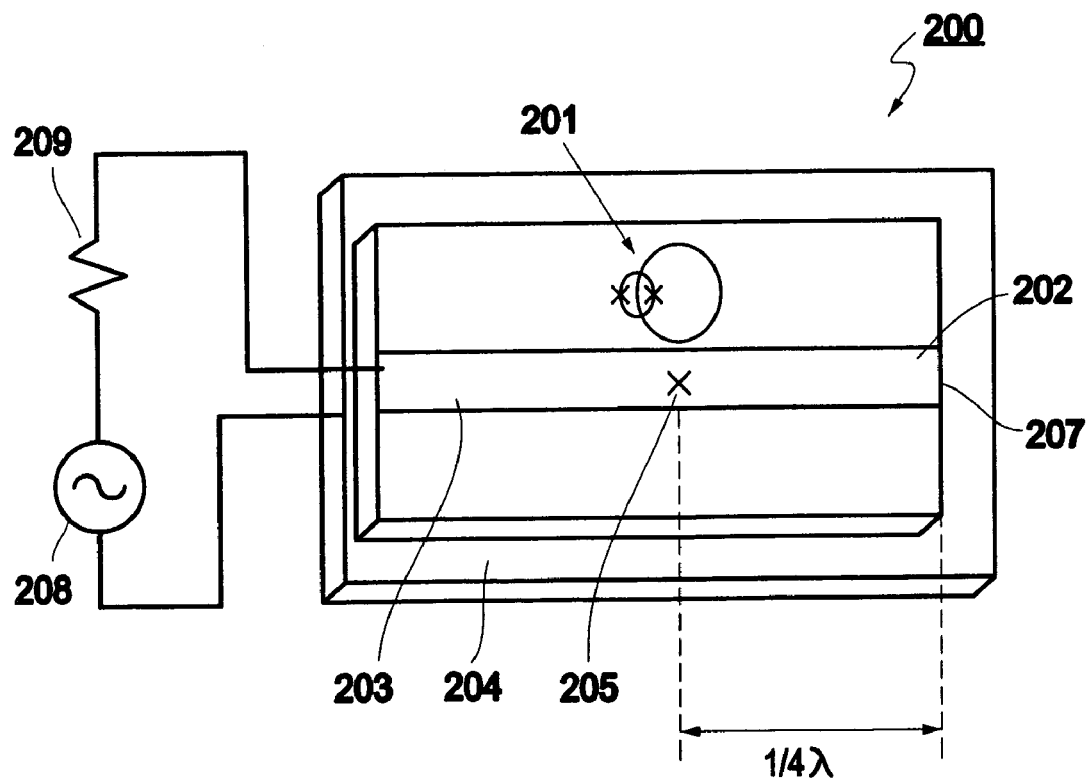
FIG. 2 illustrates a second exemplary configuration 200 for coupling to a current-based qubit, using a superconducting microstrip transmission line with a shorted end.
Figure 3:
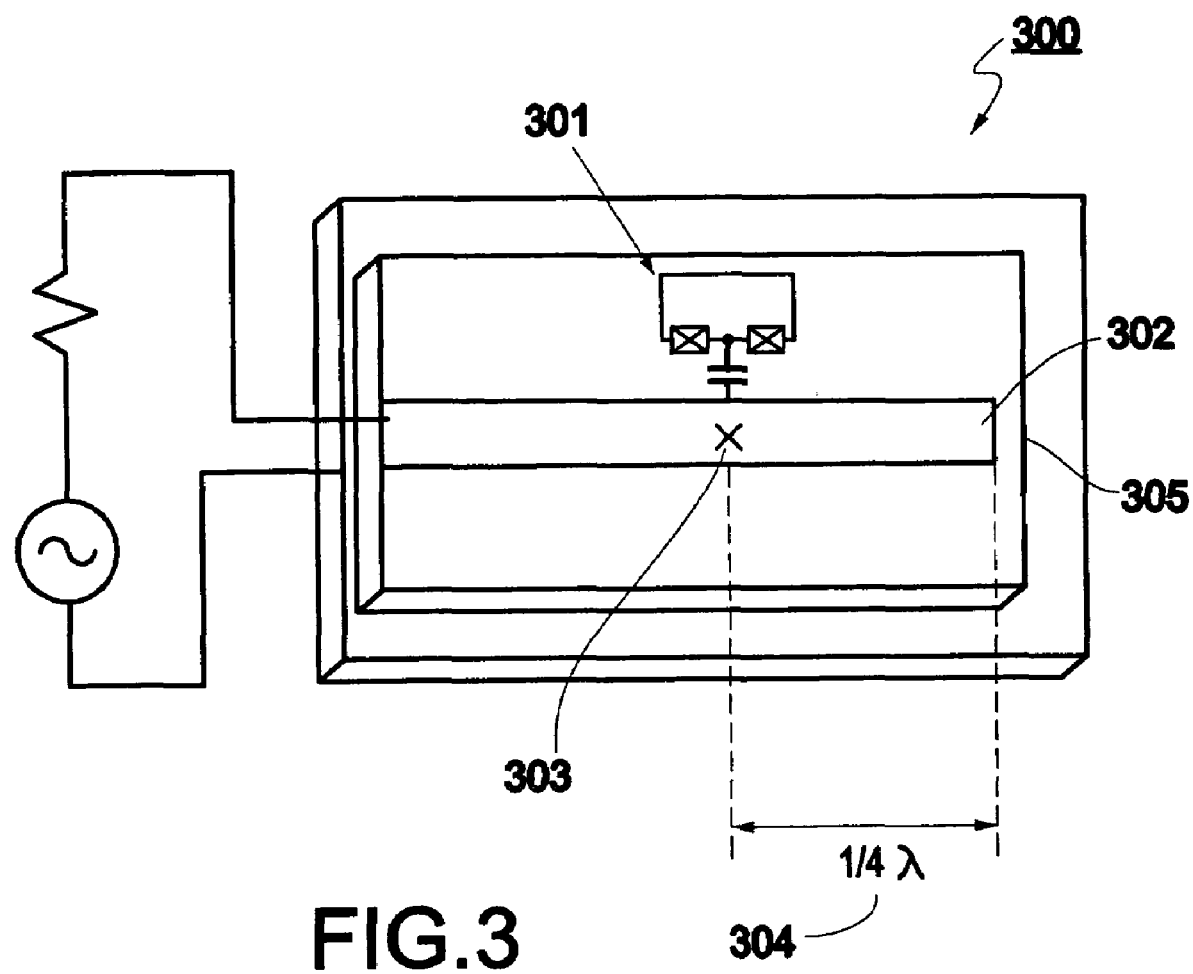
FIG. 3 illustrates a third exemplary configuration 300 for coupling to a voltage-based qubit, using a superconducting microstrip transmission line with an open end.

FIGS. 2 and 3 show additional non-limiting alternative configurations 200, 300 of transmission lines that further illustrate the concepts of the present invention.

The exemplary configuration 200 of FIG. 2 shows a current-biased qubit 201 with superconducting microstrip line 202. The microstrip is formed from two superconducting layers 203, 204, wherein superconducting layer 204 forms a planar surface beneath the layer containing the qubit 201 and superconducting layer 203. It is noted that current node 205 is located at the ¼ wavelength position 206 from the shorted end 207 of the microstrip line 202. Current source 208 represents the current source of the biasing circuit, including noise and resistor 209 represents the output impedance of the current source, including noise.

The exemplary configuration 300 of FIG. 3 shows a voltage-biased qubit with superconducting microstrip line 302. The voltage node 303 is located at the ¼ wavelength position 304 from the open end 205 of the microstrip line 302.

Figure 4:
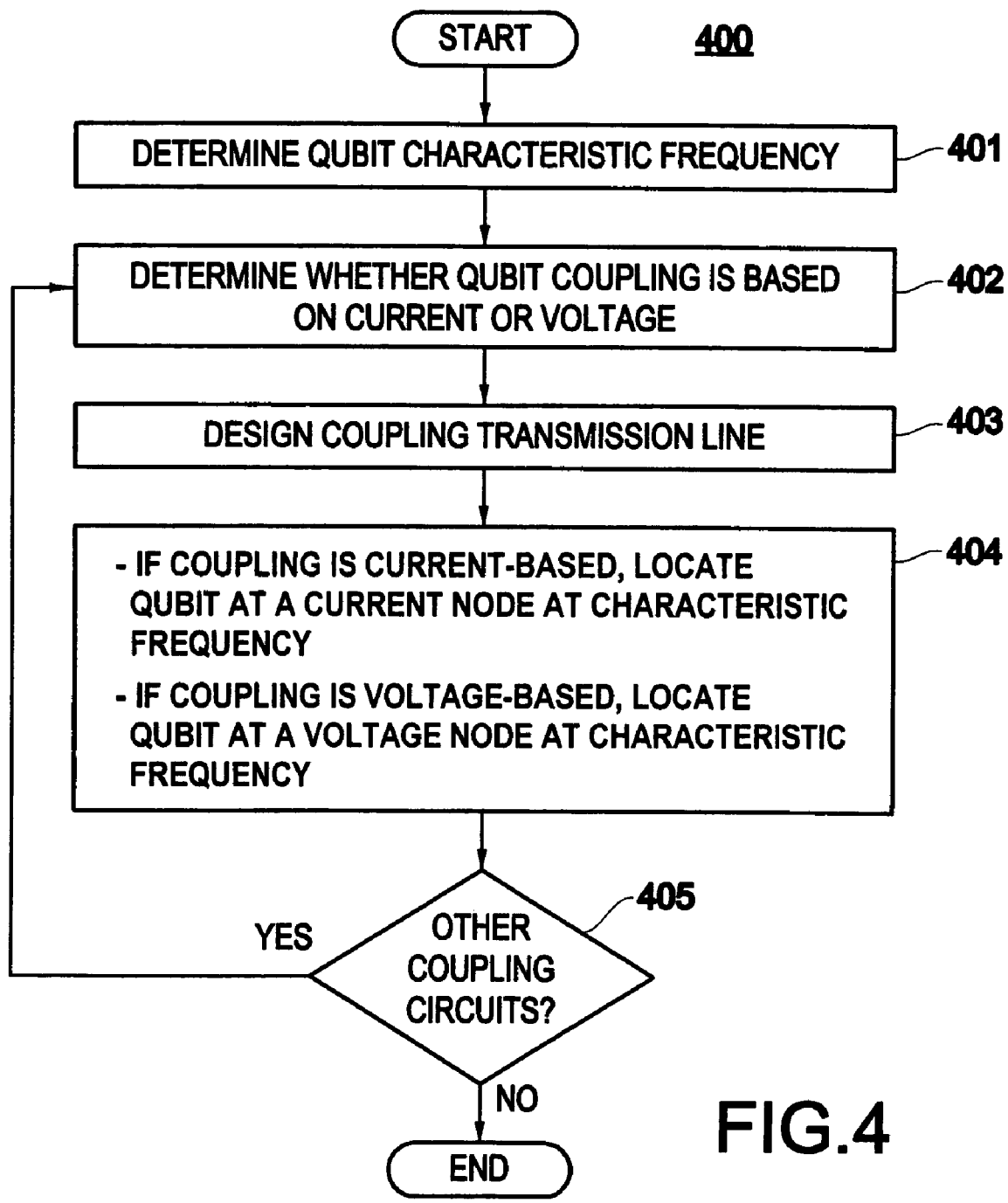
FIG. 4 illustrates an exemplary basic flowchart 400 of the techniques described herein.

FIG. 4 shows an exemplary flowchart 400 for the basic concepts of implementing the present invention. In step 400, the appropriate characteristic frequency of the qubit is determined. As exemplarily discussed above, this characteristic frequency might be frequency F01.

In step 402, the designer determines whether the qubit coupling circuit being designed is based on a magnetic/current principle or on a voltage principle, and, in step 403, a transmission line is designed.

In step 404, the qubit is located on the transmission line at either a current node or a voltage node, as based on whether the coupling is current-based or voltage-based.

Finally, in step 405, remaining coupling circuits, if any, are similarly addressed by the designer.

It will be readily understood by one of ordinary skill in the art that the exemplary design process shown in FIG. 4 is only for illustration, since a designer would typically be considering all these steps more or less simultaneously, along with other aspects of the design that are not covered in this flowchart.

Using the methods exemplarily described herein, combined with operating the qubit at a degenerate point, would result in a qubit having, to first order, no loss in decoherence from coupling to the environmental. At the same time, the qubit can still be operated and measured using the same sets of transmission lines.

Thus, in summary, the present invention provides one method of minimizing the effects of the environment on the quantum mechanical state of the qubit and to minimize the decoherence from the control and readout circuits of the qubit.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of coupling a qubit, said method comprising:
   providing a transmission line for at least one of controlling said qubit and reading out a state of said qubit; and
   locating said qubit near a transmission line approximately at a location corresponding to a node at a predetermined frequency, said predetermined frequency comprising a basic operating frequency F01 of said qubit as a frequency difference between a lowest energy state of said qubit and a second lowest energy state of said qubit.

2. The method of claim 1, wherein said node is located at a ¼ wavelength location away from an end of said at least one transmission line at said predetermined frequency.

3. The method of claim 1, wherein said node is generated by forming one of a shorted end on said at least one transmission line and an open end on said at least one transmission line.

4. The method of claim 1, wherein said at least one transmission line comprises a superconducting material.

5. The method of claim 1, wherein said at least one transmission line comprises one of a coplanar stripline and a microstrip line.

6. The method of claim 1, wherein said qubit comprises a current-biased qubit and said node comprises a current node.

7. The method of claim 1, wherein said qubit comprises a voltage-biased qubit and said node comprises a voltage node.

8. The method of claim 1, wherein an input impedance of said transmission line approximately matches an output impedance of a circuit that provides said one of controlling said qubit and reading out a state of said qubit.

9. The method of claim 1, further comprising:
adjusting a ratio of a size of said qubit to a length of said transmission line.

10. A circuit comprising:
a qubit having a basic operating frequency F10 being a frequency difference between a lowest energy state of said qubit and a second lowest energy state of said qubit; and
at least one transmission line related to an operation of said qubit, wherein said qubit is located near said transmission line approximately at a node defined relative to said basic operating frequency.

11. The circuit of claim 10, wherein said node is located at ¼ wavelength location away from an end of said at least one transmission line at said basic operating frequency.

12. The circuit of claim 10, wherein said node is generated by one of a shorted end on said at least one transmission line and an open end on said at least one transmission line.

13. The circuit of claim 10, wherein said at least one transmission line comprises a superconducting material.

14. The circuit of claim 10, wherein said at least one transmission line comprises one of a coplanar stripline and a microstrip line.

15. The circuit of claim 10, wherein said qubit comprises a current-biased qubit and said node comprises a current node.

16. The circuit of claim 10, wherein said qubit comprises a voltage-biased qubit and said node comprises a voltage node.

17. The circuit of claim 10, wherein an input impedance of said transmission line approximately matches an output impedance of a circuit that provides said one of controlling said qubit and reading out a state of said qubit.

18. The circuit of claim 10, further comprising:
one of a current source and a voltage source connected to said transmission line to provide one of a current and a voltage to bias said qubit.

* * * * *